Feb. 29, 1944.    J. F. BLASKI    2,342,916
ARCHED WOODEN RAFTER
Filed Oct. 26, 1942

Inventor:
John F. Blaski
By: Leslie W. Fricke
Attorney.

Patented Feb. 29, 1944

2,342,916

UNITED STATES PATENT OFFICE 2,342,916

ARCHED WOODEN RAFTER

John F. Blaski, Chicago, Ill.

Application October 26, 1942, Serial No. 463,435

1 Claim. (Cl. 20—0.5)

My invention relates to an arched wooden rafter and method of making the same, and more particularly to ways and means for so constructing a laminated rafter that any tendency to straighten will be prevented.

An object of my invention is to provide a construction of laminated wooden rafter that will prevent longitudinal shift of the laminations.

Another object of my invention is to provide a laminated wooden rafter construction with means to hold the rafter in curved or arched form without flattening.

A further object of my invention is to provide an arched laminated wooden rafter with the laminations bolted together and with the bolts disposed in angular relation with respect to the length and height of the rafter so as to utilize certain force components of the same to resist endwise slip of the laminations and tendency of the rafter to flatten.

Another object of my invention is to provide a novel method of making arched laminated wooden rafters that will prevent endwise slip of the laminations and at the same time maintain the true arched form of the rafter.

The above, other and further objects of my invention will be apparent from the following description and the accompanying drawing.

The accompanying drawing illustrates a rafter constructed in accordance with the principles of my invention, and also the method of making the same, and the views thereof are as follows.

Figure 1:
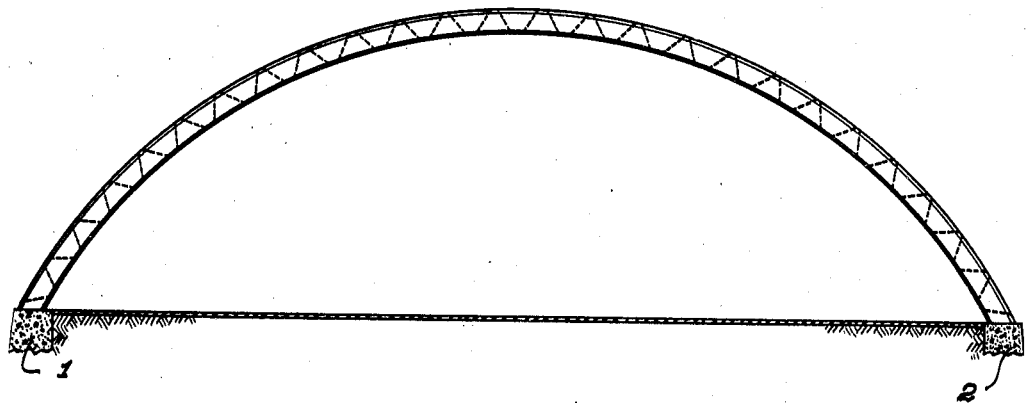
Figure 1 is a schematic side elevational view of a rafter set up in place.

The drawing will now be explained.

Figure 1 illustrates an arched laminated rafter of my invention as the same appears in place, with its ends supported on suitable piers 1 and 2, which are placed in the ground in any approved manner.

Figure 2:
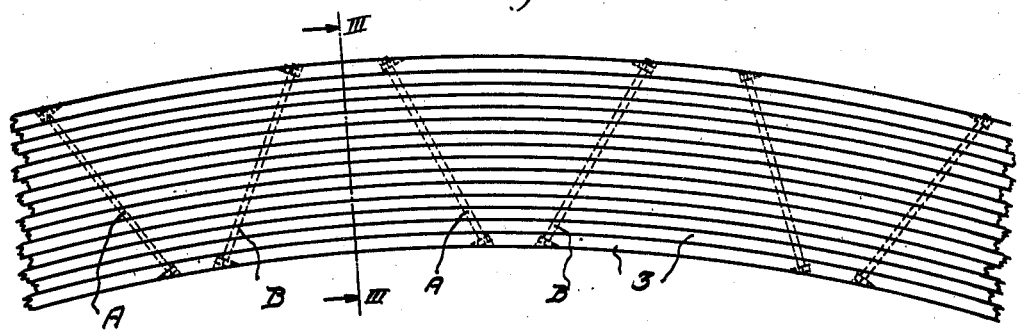
Figure 2 is an enlarged fragmentary side elevational view of a portion of the rafter showing the laminations and the preferred manner of inserting the bolts.
Figure 3:
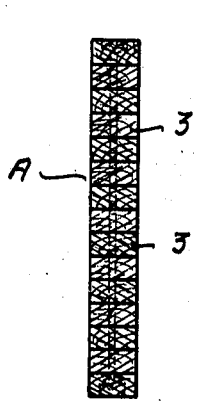
Figure 3 is an enlarged cross-sectional view taken in the plane of line 3—3 of Figure 2.

Figure 2 is an enlarged side elevational view of a fragmentary portion of the rafter and comprises a plurality of laminations 3, of wood, arranged in end to end relation and piled one on top of another to provide the desired height of the finished rafter.

In arching the rafter the laminations 3 are inserted in a suitable jig so designed as to curve the laminations to the proper form desired. When the proper number of laminations as to height and length, have been placed in the jig bolt holes are drilled to receive the securing bolts. I have found that if the bolts are inserted in angular relation with respect to the length and height of the rafter, in other than right angular relation, the rafter when removed from the jig will retain its true arched form and there will be no endwise shift of the laminations. In other words, a rafter bolted together in accordance with my invention comes from the assembly jig in its completed and true form.

I prefer to arrange the bolts in two series, inclining the bolts of one series at a different angle from the inclination of the other series. In Figure 2, A represents one series of bolts which are substantially parallel when in place and which are inclined in the same direction as may be observed. B represents the other series of bolts which are substantially parallel and which are inclined in a direction opposite to the inclination of the bolts in series A.

Because of the inclination of the bolts as described forces are set up effective in more than one direction. It will be observed that the vertical component of the forces set up by the bolts, when the nuts are tightened thereon is vertical, that is substantially at right angles to the length of the rafter. Other force components act in the direction of the length of the rafter.

The vertical components of the forces hold the laminations tightly together. The horizontal components of the forces of the bolts of series A will act in the same direction as the horizontal components of the bolts of the series B but in opposite relation. That is to say, the horizontal component of one of the bolts A will oppose, with equal force, the horizontal component of the bolt B next to it. The horizontal components of the forces therefore tend to and do hold the rafter in its bent or arched position and prevent any tendency to flatten, so that the rafter as removed from the assembly jig will be true to form in every respect. The horizontal forces exerted by the bolts being equal and opposite will prevent any end slip of any of the laminations.

Figure 4:
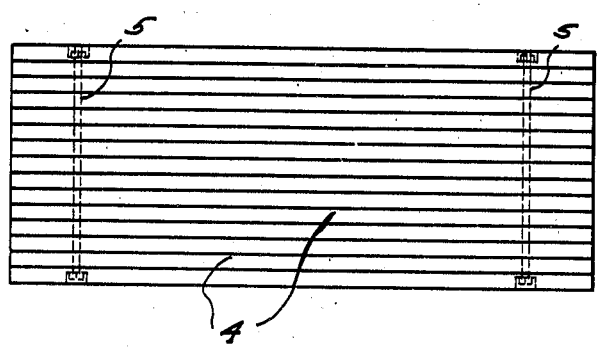
Figure 4 is a figure illustrative of the usual manner of constructing a laminated rafter and showing the present manner of inserting the bolts.

Figure 4 is illustrative only and is inserted to exemplify one form of present laminated arched roof construction in use. In this present assembly the laminations 4 are held together by bolts 5 which pass through the rafter in a direction perpendicular to its length, the bolts being substantially parallel or as much so as is possible in an arched rafter. It will be obvious that the only forces exerted by the bolts 5 will be compressive forces acting in the direction of the lengths of the bolts so that the laminations are thus tightly held together in squeezed relation. It is also obvious that with the bolts arranged as shown in Figure 4 there are no components acting in any other direction so that when an arched laminated roof is assembled in a jig, to secure the proper bend in the rafter, and the bolts 5 are inserted then when the rafter is removed from the jig, there being no forces acting to prevent endwise shifting of the laminations, the rafter will tend to flatten or straighten, thus misaligning the ends of the rafters and making the task of installation a difficult one.

By the application of the bolts in directions inclined or biased with respect to the length of the rafter any tendency for any of the laminations to shift in endwise direction is prevented.

My invention is especially useful in connection with the manufacture of arched laminated rafters which are manufactured in one place and transported for erection elsewhere. With my invention it is possible to manufacture these rafters in quantity production with full assurance that when set up on the job all of the rafter will be alike and there will be no endwise shifting of the laminations to make erection difficult.

As before stated, the angular oblique or biased application of the tie-bolts sets up forces which act lengthwise of the rafter and other forces which act in the direction of the height of the rafter so that no shifting of any sort or of any degree takes place.

I prefer to apply the tie-bolts so that those of one series alternate with those of the other series.

I do not intend to limit my invention to the details of construction shown and described except only in so far as certain of the appended claim may be specifically so limited, as it will be obvious that modifications may be made without departing from the principles of my invention.

I claim:

A laminated arched rafter comprising a plurality of layers of wooden strips bent to the curved form desired, two series of tie-bolts through said layers, the bolts of one series being substantially parallel one to another and inclined in one direction with respect to the length of the rafter, the bolts of the other series being substantially parallel one to another and inclined in an opposite direction, the bolts being inserted so that the bolts of one series alternate with the bolts of the other series whereby the horizontal components of the forces of one series of bolts neutralize the horizontal components of the forces of the other series thereby preventing endwise shifting of the layers.

JOHN F. BLASKI.